US005307455A

United States Patent [19]

Higgins et al.

[11] Patent Number: 5,307,455

[45] Date of Patent: Apr. 26, 1994

[54] DISPLAY OF MULTIPLE VARIABLE RELATIONSHIPS

[75] Inventors: Michael C. Higgins, Palo Alto; James M. Lindauer, San Francisco, both of Calif.

[73] Assignee: Hewlett Packard Company, Palo Alto, Calif.

[21] Appl. No.: 508,220

[22] Filed: Apr. 11, 1990

[51] Int. Cl.[5] .......................... G06F 3/14; G06F 7/00

[52] U.S. Cl. .................................... 395/140; 395/118

[58] Field of Search ....................... 395/140, 118, 100; 340/722, 743, 723

[56] References Cited

U.S. PATENT DOCUMENTS

| | | | |
|---|---|---|---|
| 3,641,554 | 2/1972 | Slavin . | |
| 3,872,461 | 3/1975 | Jarosik et al. . | |
| 4,277,835 | 7/1981 | Garziera et al. | 395/140 |
| 4,357,691 | 11/1982 | Goodchild . | |
| 4,482,861 | 11/1984 | Jalovec et al. | 324/77 B |
| 4,522,475 | 6/1985 | Ganson | 352/79 |
| 4,734,867 | 3/1988 | Janin | 364/518 |
| 4,752,919 | 6/1988 | Clark | 368/223 |
| 4,785,564 | 11/1988 | Gurtler | 40/448 |
| 4,845,642 | 7/1989 | Itaya et al. | 395/140 |
| 5,075,873 | 12/1991 | Seki et al. | 395/140 |
| 5,228,119 | 7/1993 | Mihalisin et al. | 395/140 X |

*Primary Examiner*—Heather R. Herndon

[57] ABSTRACT

A method for displaying the joint variation of two or more dependent numerical variables $v_1$ and $v_2$ with respect to a third, independent numerical variable $v_3$. For each of a sequence of numerical values of $v_3$, the coordinate pairs $(v_1(v_3), v_2(v_3))$ are displayed on a two-dimensional Cartesian graph of $v_1$ versus $v_2$. A cursor or other indicator is provided on this graph that identifies the numerical value of the third variable $v_3$ at any of the original sequence of such values. The cursor position is continuously interpolated between two consecutive numerical values of $v_3$, corresponding to continuous variation of $v_3$ between these two consecutive numerical values. The joint variation of $v_1$ and $v_2$ is also displayed by provision of two univariate graphs that exhibit $v_1$ and $v_2$ separately as functions of the third variable $v_3$, with a suitable cursor or other movable indicator associated with each graph. The joint variation of $v_1$ and $v_2$ is also displayed as a numerical table of the values of $v_1$, $v_2$ and $v_3$, with a cursor indicating the current choice of value of the variable $v_3$. The graph of $v_1(v_3)$ versus $v_2(v_3)$ may be provided with an overlay showing normal and/or abnormal ranges of the coordinate pair $(v_1, v_2)$.

14 Claims, 6 Drawing Sheets

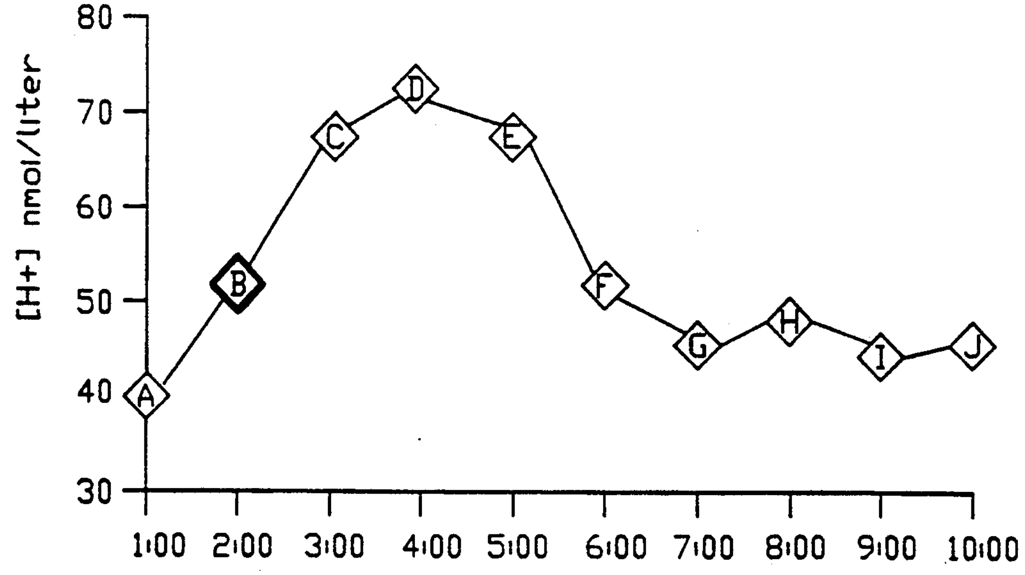
FIG.-1A
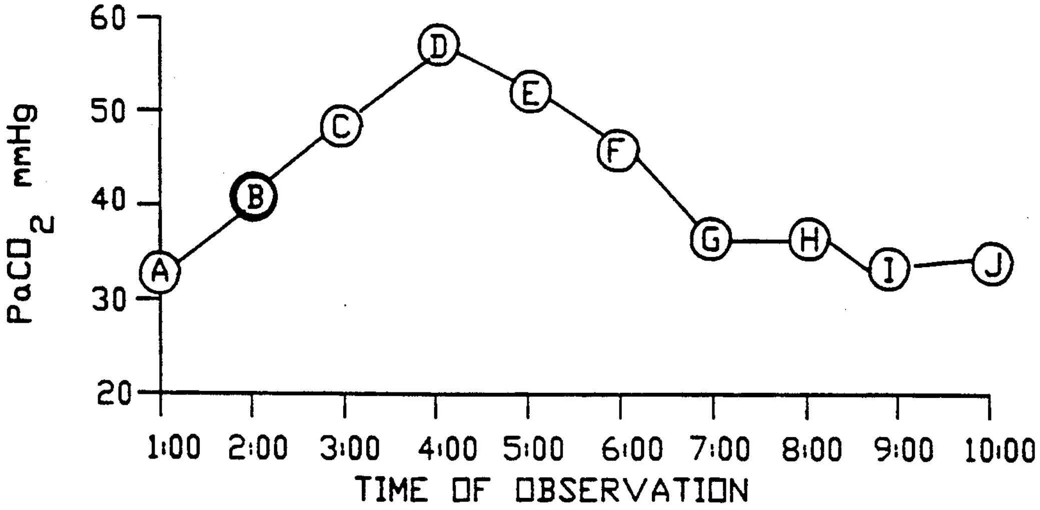
FIG.-1B
| TIME | 1:00 (A) | 2:00 (B) | 3:00 (C) | 4:00 (D) | 5:00 (E) | 6:00 (F) | 7:00 (G) | 8:00 (H) | 9:00 (I) | 10:00 (J) |
|---|---|---|---|---|---|---|---|---|---|---|
| $PCO_2$ | 33 | 41 | 48 | 57 | 51 | 46 | 36 | 36 | 32 | 34 |
| [H+] | 39 | 52 | 68 | 72 | 68 | 52 | 46 | 47 | 43 | 45 |
| $PO_2$ | 76 | n.a. | n.a. | 79 | 108 | 126 | 139 | 159 | 145 | 137 |
| pH | 7.41 | 7.28 | 7.17 | 7.14 | 7.17 | 7.29 | 7.34 | 7.33 | 7.37 | 7.35 |
FIG.-1C

| TIME | 1:00 (A) | 2:00 (B) | 3:00 (C) | 4:00 (D) | 5:00 (E) | 6:00 (F) | 7:00 (G) | 8:00 (H) | 9:00 (I) | 10:00 (J) |
|---|---|---|---|---|---|---|---|---|---|---|
| $PCO_2$ | 33 | 41 | 48 | 57 | 51 | 46 | 36 | 36 | 32 | 34 |
| [H+] | 39 | 52 | 68 | 72 | 68 | 52 | 46 | 47 | 43 | 45 |
| $PO_2$ | 76 | n.a. | n.a. | 79 | 108 | 126 | 139 | 159 | 145 | 137 |
| pH | 7.41 | 7.28 | 7.17 | 7.14 | 7.17 | 7.29 | 7.34 | 7.33 | 7.37 | 7.35 |
FIG.-2
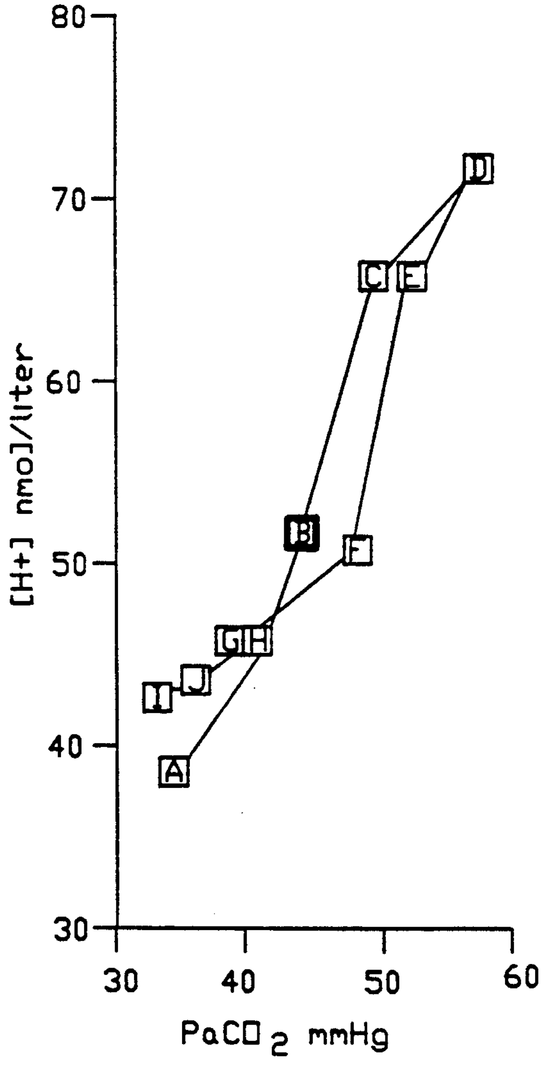
FIG.-1D
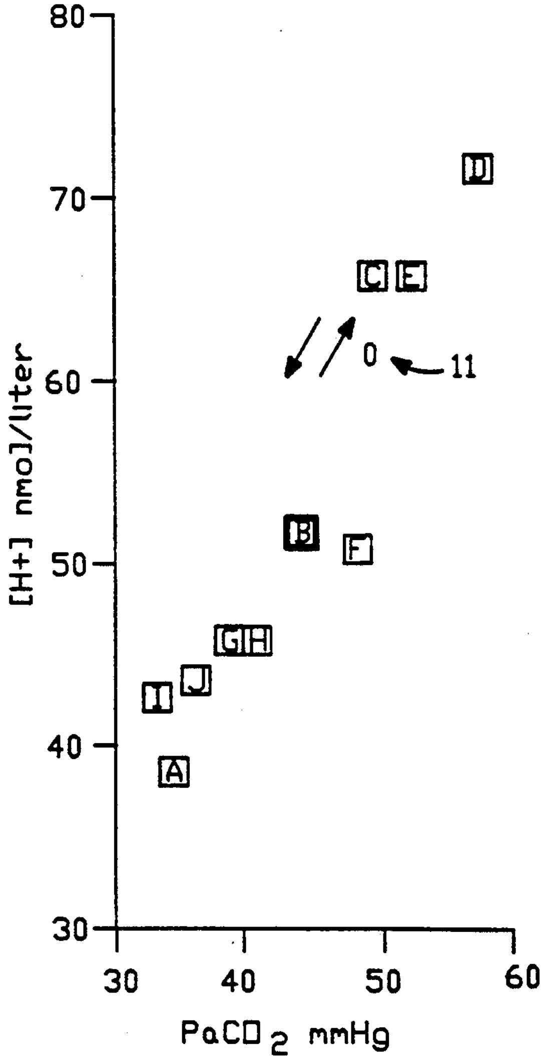
FIG.-3

DISPLAY OF MULTIPLE VARIABLE RELATIONSHIPS

DESCRIPTION

1. Technical Field

This invention relates to graphical ana numerical displays of joint variation of two or more variables with variation of a third independent variable.

2. Background of the Invention

One time-honored approach to display of the variation of a dependent variable, such as chemical concentration of a given substance, with respect to an independent variable, such as time or system pressure, is to present this variation in a numerical table or as a two-dimensional graph, or both. Where two or more such dependent variables depend upon an independent variable, each dependent variable would be presented separately as a function of the independent variable.

One variant of this approach is to present the independent variable as a coordinate along the horizontal axis of the graph and to present the two dependent variables as two separate curves, each referenced to a different vertical axis on the same graph. While this approach may be suggestive of a relationship between the two or more dependent variables, in practice it is often difficult to divine the quantitative or qualitative relationship between these dependent variables from a comparison of two or more curves on a single graph. What is needed here is a method for presenting the relationship of two or more related dependent variables in a single graphical format in which the independent variable is allowed to vary continuously over its permitted range.

A CRT display system, in which analog data from a plurality of sources are converted to digital form for storage in a multi-channel memory, is disclosed by Slavin in U.S. Pat. No. 3,641,554. The analog data are multiplexed and received on a drum memory, with one memory channel being assigned to each analog source. The time history of signals on each memory channel may be subsequently reconverted to analog form and displayed on a CRT in a conventional two-dimensional graph.

Jarovsik et al., in U.S. Pat. No. 3,872,461, disclose a CRT display system in which display of an electrical signal, formed in a conventional manner using vertical and horizontal trace deflection signals, alternates in time with display of an alphanumeric symbol or character. The electrical signal and corresponding symbol or character are both designated by a three-bit digital word so that any of eight different electrical signals and corresponding symbols or characters may be chosen for the alternating display.

In U.S. Pat. No. 4,482,861 Jalovec et al. disclose a waveform measurement and display system having two signal processing channels and a sweep generator and arranged to provide either (1) univariate graphical displays of each of two signals x(t) and y(t) versus the independent variable t or (2) a bivariate graphical display x versus y and a single univariate display y(t) versus t. In each display mode the two graphical displays are offset relative to one another on a single screen. In the second display mode a first cursor on the y(t) versus t graph and a second cursor on the x(t) versus y(t) graph are provided that correspond to the same time t on the two graphs. The time position t of the cursor is selected by a keyboard from a discrete set of time points for which the input signal data x(t) and y(t) are available from the external data source.

A similar waveform display system is discussed, but with far less detail, by Janin et al. in U.S. Pat. No. 4,734,867. Choice of the independent variable t from a continuous range of that variable does not appear to be available.

Some previous workers have found ways to indicate or suggest motion of an object in a single view. This is an attractive feature where graphical presentations are made of the variation of two or more variables with respect to a third, implicit independent variable such as time. Goodchild, in U.S. Pat. No. 4,357,691, discloses use of a rectangular clock face in which the passage of time is indicated by the intersection of a horizontal line, moving vertically across the clock face and representing the passage of hours of time, and a vertical line, moving horizontally across the clock face and representing the passage of minutes of time. Display of the continuous passage of time is not possible here as each of the horizontal line and vertical line changes positions abruptly and incrementally in response to passage of time.

In U.S. Pat. No. 4,522,475, Ganson reviews several known methods of representing motion of an object in a single photograph and discloses another method, wherein motion of the object is shown by displaced images of the object in different colors. The moving object and the background are illuminated by light sources that produce a plurality of lights of different spectral compositions at different time points. Collectively, the illumination with the different spectral compositions sums to natural light so that the non-moving background appears in natural color. The moving object is shown by a spaced apart series of sharp images of that object in different colors corresponding to the times at which the object is illuminated by the different light sources. Again, display of continuous motion of a moving object is not possible here as the different positions of the moving object are shown at discrete and spaced apart positions in the scene.

Ganson's method uses color as a marker to index the independent variable. Other workers have used alphabet letters, numerals or a label showing the actual value of the independent variable. All these methods suffer from ambiguity when the images or points on a graph are approximately superimposed on one another, where one marker can easily obscure another marker. These methods give no measure of the size of the interval of the independent variable between two consecutive images or points.

A clock with a digital indicator representing the passage of time in hours and a bar graph representing passage of time in minutes is disclosed by Clarke in U.S. Pat. No. 4,752,919. Use of the bar graph to display the passage of time in minutes is limited to discrete incremental values of time because each such increment in time is represented by one or more light emitting diodes or similar discrete light sources that are spaced apart by a non-infinitesimal distance.

Gurtler, in U.S. Pat. No. 4,785,564, discloses an electronic notepad having a graphical display area in which the position of a stylus or lightpen can be entered by two different methods. The write/display area allows display of graphical material or text by the use of a large number (40,000 or more) of liquid crystal display elements arranged in a manner reminiscent of display on a cathode ray tube by a television set. Each liquid crystal display is controlled by two or more logic cells, one cell representing a horizontal line and a second cell representing an intersecting vertical line in the write/display area. This display device is limited to a resolution of the order of 50 lines per inch.

What is needed is graphical display means that will also allow display of approximately continuous display of the changes in an independent variable and the effect on the resulting values of two or more variables that depend on the independent variable.

SUMMARY OF THE INVENTION

These needs are met by a method in which a Cartesian coordinate system is provided for two or more dependent variables $v_1$ and $v_2$, each of which depends upon a third, independent variable $v_3$. A collection is provided of Cartesian coordinate pairs $(v_1(v_3), v_2(v_3))$ for each of a sequence of increasing values of the third variable $v_3$. The collection of these coordinate pairs is displayed on a two-dimensional graph on a computer monitor or similar screen, and an identification label, which indicates the value of $v_3$ for each coordinate pair, is provided on the graph. A numerical table (optional) may also be provided that presents $v_1(v_3)$ versus $v_3$, or $v_2(v_3)$ versus $v_3$, or both, for the set or a subset of choices of $v_3$ displayed in the graph. The numerical table may optionally be provided with a movable indicator that indicates the present choice of $v_3$. A graph of $v_1(v_3)$ versus $v_2(v_3)$is provided together with an additional movable indicator that indicates the coordinate pair $(v_1(v_3'), v_2(v_3'))$ for the current choice of numerical value $v_3=v_3'$. The first movable indicator can move continuously between two consecutive values $v_3=v_3''$ and $v_3=v_3'''$, and the second movable indicator can be interpolated between the two coordinate pairs corresponding to the choice of numerical values $v_3=v_3''$ and $v_3=v_3'''$. The interpolation for the second movable indicator position may be done linearly, quadratically or in any other consistent manner. Finally, an overlay in two or more dimensions may be provided for the graph that illustrates normal ranges and abnormal ranges of the coordinate pair $(v_1, v_2)$ on the graph.

The invention provides a multi-dimensional representation of two or more dependent variables, in the form of a bivariate graph $(v_1(v_3), v_2(v_3))$ of variations that would otherwise require a three-dimensional display, namely a plot of $(v_1, v_2, v_3)$, using a "time line" for the third variable $v_3$ that is indicated at various positions measured along the two-dimensional curve $v_1(v_3)$ versus $v_2(v_3)$. This allows the variation of $v_1$ versus $v_2$ to be displayed more directly and allows the value(s) of $v_3$ associated with local extrema for $v_1$ and/or $v_2$ to be determined directly by inspection of the $v_1$ versus $v_2$curve. Mentally, an observer can more easily appreciate the joint variation of the variables $v_1$, $v_2$ and $v_3$ from a single graph representing those variations with a single two-dimensional curve, suitably labeled, than from comparison of two or more two-dimensional graphs that each display joint variation of two of the three variables. In another embodiment, two univariate graphs of the coordinate pairs $(v_3, v_1(v_3))$ and $(v_3, v_2(v_3))$ are simultaneously displayed with a cursor on each graph indicating the presently chosen value of $v_3$.

BRIEF DESCRIPTION OF THE DRAWINGS

FIGS. 1A and 1B are graphical views of a univariate presentation of each of two dependent variables as functions of a third independent variable.

FIG. 1C is a numerical table presenting the values of the two dependent variables shown individually in FIGS. 1A and 1B, for the sequence of values of the third variable shown in those figures.

FIG. 1D is a two-dimensional plot or graph that presents the joint, observed values of the two dependent variables in FIGS. 1A and 1B for the sequence of values of the third variable shown therein.

FIG. 2 illustrates a numerical table that presents the values of the two dependent variables for each of the values of the third independent variable and highlights a chosen one of the values of the third variable according to the invention.

FIG. 3 is a two-dimensional plot similar to FIG. 1D, illustrating the use of a moving cursor to indicate a particular value of the third variable and the corresponding interpolated values of the first and second variables.

BEST MODE FOR CARRYING OUT THE INVENTION

Figure 4:
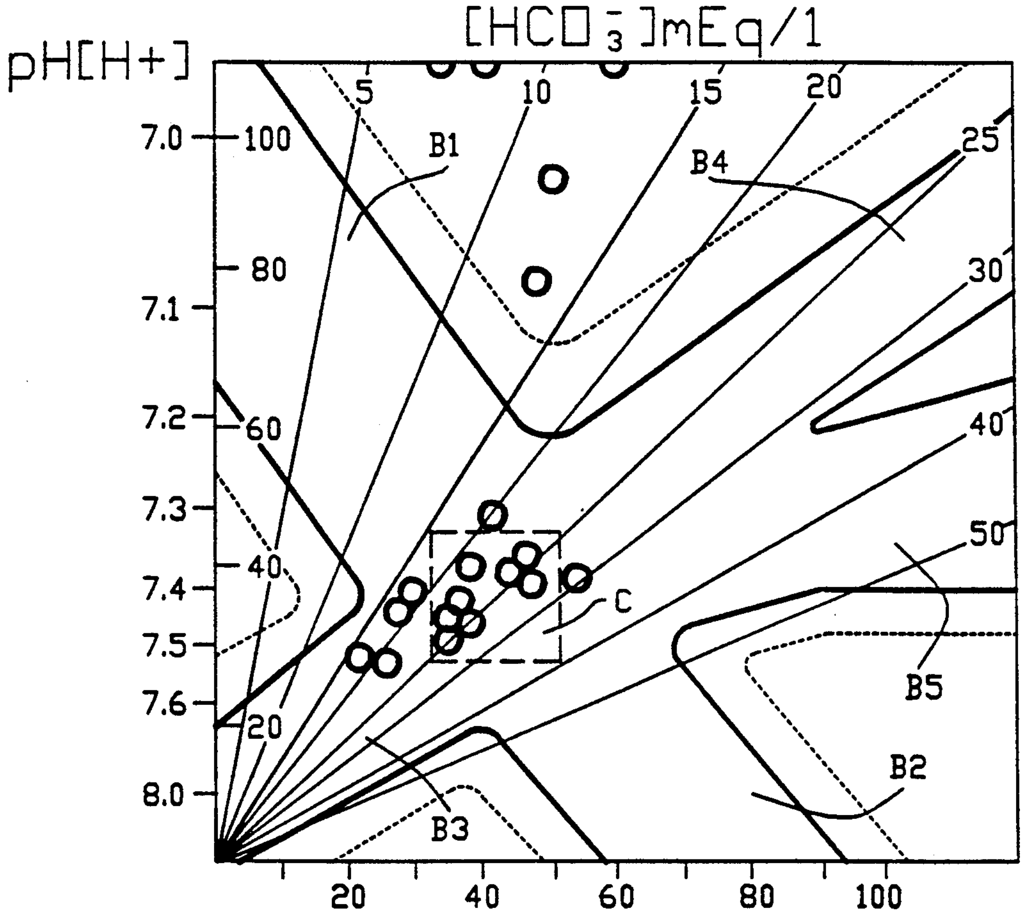
FIG. 4 is a two-dimensional plot illustrating the use of an overlay to display normal and non-normal response regions of the first and second variables.

With reference to FIG. 1A the concentration $v_1$ of a chemical constituent $H^+$of a mixture is shown as a function of the time of observation $v_3$ of this concentration variable, for a sequence of observation times 1:00, 2:00, . . . , 10:00. The observation times need not be uniformly spaced, although this may make the interpretation of the variables more straightforward. In FIG. 1B, a similar graphic presentation is made of the concentration $v_2$ of arterial $CO_2$ as a function of time for the same sequence of observation times $v_3$. As noted above, the observation times need not be uniformly spaced, but the same sequence of observation times should be used for each of the dependent variables. A plurality of two or more univariate graphs may be provided, each representing the variation of a dependent variable on an independent variable $v_3$.

A particular choice of one of the observation times may optionally be indicated or distinguished in FIGS. 1A and 1B by use of a different color, use of light of a different intensity, or use of a different icon to represent the one point on each of the two or more curves that corresponds to the chosen time value $v_3$.

The numerical values of each of the plurality of dependent variables $v_1$, $v_2$, . . . for each of the sequence of observation times may also be displayed in a numerical table, as illustrated by FIG. 1C for four dependent variables. In FIG. 1D, two dependent variables $v_1$ and $v_2$ are plotted versus one another on a two-dimensional Cartesian graph for each of the sequence of values of the third independent variable $v_3$ (here $v_3$=time of observation). In FIG. 1D, an identification label, which may be the same label as used in FIGS. 1A and 1B, is used to identify the time corresponding to the pair of coordinates representing the dependent variables. Otherwise stated, FIG. 1D is a two-dimensional graph of points whose coordinates are $(v_1(v_3), v_2(v_3))$ for each of the sequence of values of the third, independent variable $v_3$ for which observations have been made.

FIG. 2 illustrates a numerical table of the dependent variables $v_1$ and $v_2$ versus the independent variable $v_3$, where a particular observation time may be highlighted or otherwise distinguished by providing a different color or a different intensity or some other suitable icon or indicator means for the column or row of variables $v_3$, $v_1$, and $v_2$ containing a particular choice of the independent variable $v_3$. The graphical presentations illustrated in FIGS. 1A, 1B and 1D may be coordinated with the highlighting illustrated in FIG. 2 by highlighting the particular point in each of these two-dimensional graphs corresponding to that choice of the independent variable $v_3$.

More than two dependent variables may be presented in this configuration. For example, if $N(\geqq 2)$ dependent variables $v_1, v_2, \ldots, v_N$ are presented as functions of an independent variable $v_{N+1}$, as many as N univariate graphs could be displayed and as many as $N(N-1)/2$ bivariate graphs could be displayed, each graph relying on and displaying $v_{N+1}$ as the independent variable. An accompanying numerical table might display numerical values of each of the dependent variables for a sequence of choices of the independent variable $v_{N+1}$.

In another embodiment, a movable indicator is provided for the numerical table shown in FIG. 2 and the graph shown in FIG. 1D. The indicator associated with FIG. 2 is continuously movable between any two consecutive time points for which observations have been made so that, for example, the time 2:41 might be chosen for display purposes. This would be indicated by a continuously movable indicator or cursor that moves between the columns labeled 2:00 and 3:00 in FIG. 2.

A corresponding cursor or indicator is provided for FIG. 1D, as shown in FIG. 3, in which the position of the cursor is interpolated between the two adjacent observation times on the graph. For example, if the time 2:41 is chosen, the position of the cursor in FIG. 1D would be interpolated between the positions indicated by the identification labels B and C therein. This interpolation could be linear, in which case the cursor position corresponding to the time 2:41 would lie on a straight line connecting the identification labels B and C and would be approximately twice as far from the "B" label as from the "C" label. This is illustrated in FIG. 3 with a moving cursor labeled 11. The interpolation could also be made quadratically or according to some other nonlinear interpolation approach. The cursor associated with the two-dimensional graph would move continuously between two consecutive observation times, or other consecutive values of the third variable $v_3$, and would be controlled by the operator's choice of the interpolated value of the third variable $v_3$. The rate of cursor movement between two labeled values of the variable $v_3$ represents the rate of change of $v_3$ in that interval.

If linear or quadratic interpolation is used between two graph positions $(v_1(v_{3,n}), v_2(v_{3,n}))$ and $(v_1(v_{3,n+1}), v_2(v_{3,n+1}))$, this interpolation may be implemented by determining the interpolated graph point $(v_1, v_2)$ by the relations $$v_1=[v_1(v_{3,n})(v_{3,n+1}-v_3)+v_1(v_{3,n+1})(v_3-v_{3,n})]/(v_{3,n+1}-v_{3,n}), \quad (1)$$

$$v_2=[v_2(v_{3,n})(v_{3,n+1}-v_3)+v_2(v_{3,n+1})(v_3-v_{3,n})]/(v_{3,n+1}-v_{3,n}), \quad (2)$$

for linear interpolation where $v_{3,n}, \leqq v_3 \leqq v_{3,n+1}$ and $v_{3,n} < v_{3,n+1}$, and $$v_1 = [v_1(v_{3,n-1})(v_{3,n+1}-v_3)(v_{3,n}-v_3)(v_{3,n+1}-v_{3,n}) + v_1(v_{3,n})(v_{3,n+1}-v_3)(v_3-v_{3,n-1})(v_{3,n+1}-v_{3,n-1}) + v_1(v_{3,n+1})(v_3-v_{3,n})(v_3-v_{3,n-1})(v_{3,n}-v_{3,n-1})]/(v_{3,n+1}-v_{3,n})(v_{3,n+1}-v_{3,n-1})(v_{3,n}-v_{3,n-1}), \quad (3)$$

$$v_2 = [v_2(v_{3,n-1})(v_{3,n+1}-v_3)(v_{3,n}-v_3)(v_{3,n+1}-v_{3,n}) + v_2(v_{3,n})(v_{3,n+1}-v_3)(v_3-v_{3,n-1})(v_{3,n+1}-v_{3,n-1}) + v_2(v_{3,n+1})(v_3-v_{3,n})(v_3-v_{3,n-1})(v_{3,n}-v_{3,n-1})]/(v_{3,n+1}-v_{3,n})(v_{3,n+1}-v_{3,n-1})(v_{3,n}-v_{3,n-1}), \quad (4)$$

for quadratic interpolation, where it is assumed here that $v_{3,n-1} \leqq v_3 \leqq v_{3,n+1}$ and $v_{3,n-1} < v_{3,n} < v_{3,n+1}$. Other approaches for quadratic interpolation may also be used here.

The third variable $v_3$ is not limited to the time variable here, or to the particular chemical reactions corresponding to the choices of the variables $v_1$ and $v_2$, namely $$H_2O+CO_2 \rightleftharpoons H_2CO_3 \rightleftharpoons H^+ + HCO_3^-. \quad (5)$$

Other suitable choices of this third variable might be system pressure p or ambient temperature T, and the variables $v_1$ and $v_2$ may be chosen arbitrarily as well. The output display of the present invention may be achieved in presently available computer monitors.

The two-dimensional graph shown in FIG. 1D may be provided with an overlay or underlay that illustrates different regions of each of the two dependent variables $v_1$ and $v_2$ that correspond to normal and/or abnormal situations.

For example, the reaction products in Eq. (1), $H^+$ and $HCO_3^-$, are plotted versus one another in FIG. 4, where $pH = -\log_{10}$(molar conc. of $H^+$ ions present) provides a measure of the $H^+$ concentration. In a central region C indicated by a dotted line quadrilateral in FIG. 4, the balance of $H^+$ and $HCO_3^-$ ions is believed to be approximately normal, with no cause for concern. In the branch B1 of the overlay, metabolic acidosis is present, indicating the presence of too much acidic substances for the amount of $HCO_3^-$ ions available to buffer the $H^+$ ions. Metabolic alkalosis is present in branch B2, respiratory alkalosis is present in branch B3, and acute and chronic acidosis are present, respectively, in branches B4 and B5. By plotting the development with time of the measured pH and $HCO_3$ concentration of a person in response to a stimulus, as illustrated in FIG. 4, the overlay can be examined to determine whether the person's system stays entirely in the normal region or strays into one or more of the non-normal regions as the system responds to the stimulus over time.

Figure 5:
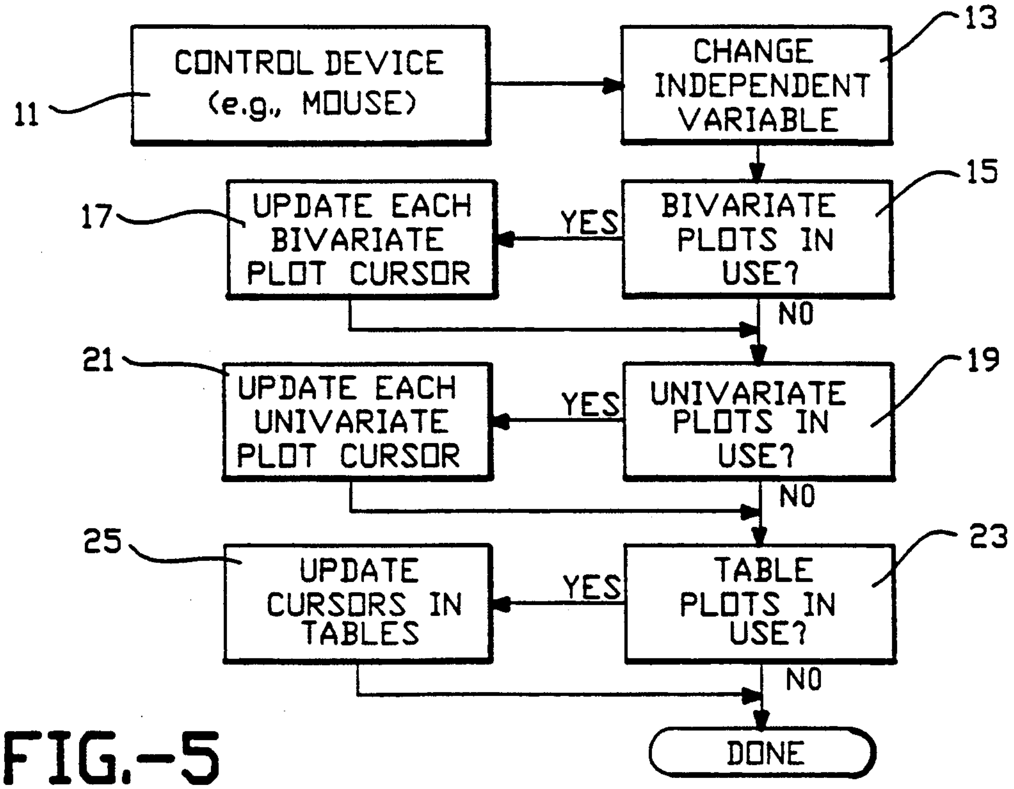
FIG. 5 is a block diagram indicating the major logical steps performed in practicing the invention.

FIG. 5 is a flow diagram indicating the major logical steps and their order according to one embodiment of the invention. In response to an operator's movement or change of the control device in step 12, which may be a mouse that controls a cursor on a display screen (not shown), the independent variable $v_3$ is changed by an independent variable change module in step 13. The change $\Delta v_3$ in the independent variable $v_3$ is communicated to a bivariate plot control module in step 15 that determines whether one or more bivariate Cartesian graphs such as FIG. 1D are presently in use to display values of two or more dependent variables $v_1$ and $v_2$ jointly as the independent variable $v_3$ changes. If a bivariate graph is currently being displayed, the bivariate plot control module in step 15 sends a command to a bivariate plot cursor control module in step 17 to change the cursor coordinates on each such bivariate graph by the amounts $$\Delta v_1 = v_1(v_{3,old} + \Delta v_3) - v_1(v_{3,old}) \quad (6)$$

$$\Delta v_2 = v_2(v_{3,old} + \Delta v_3) - v_2(v_{3,old}) \quad (7)$$

in first and second coordinate directions on the graph, and return control to the main program sequence.

If no bivariate graph is currently being displayed, or if a bivariate graph is being displayed and has been updated as required, the change $\Delta v_3$, is communicated to a univariate plot control module in step 19 that determines whether one or more univariate Cartesian graphs are being used to display values of one or more dependent variables, $v_1$or $v_2$ or both, as a function of the variable $v_3$. If one or more univariate Cartesian graphs are currently being displayed, a univariate plot cursor control module in step 21 changes the cursor coordinates on each such univariate graph according to the appropriate individual equations (2) and (3) and returns control to the main program sequence.

If one or more numerical tables of at least one of the dependent variables $v_1$ or $v_2$, as a function of $v_3$, are currently being displayed, a table plot cursor control module in step 23 issues a command to a table cursor control module in step 25 to update the position and displayed value of the cursor in each such table to reflect the change in $v_3$ and return control to the main program sequence as indicated in FIG. 5. The pairs of steps 15/17, 19/21 and 23/25 may be permuted in any order according to the invention.

Figure 6:
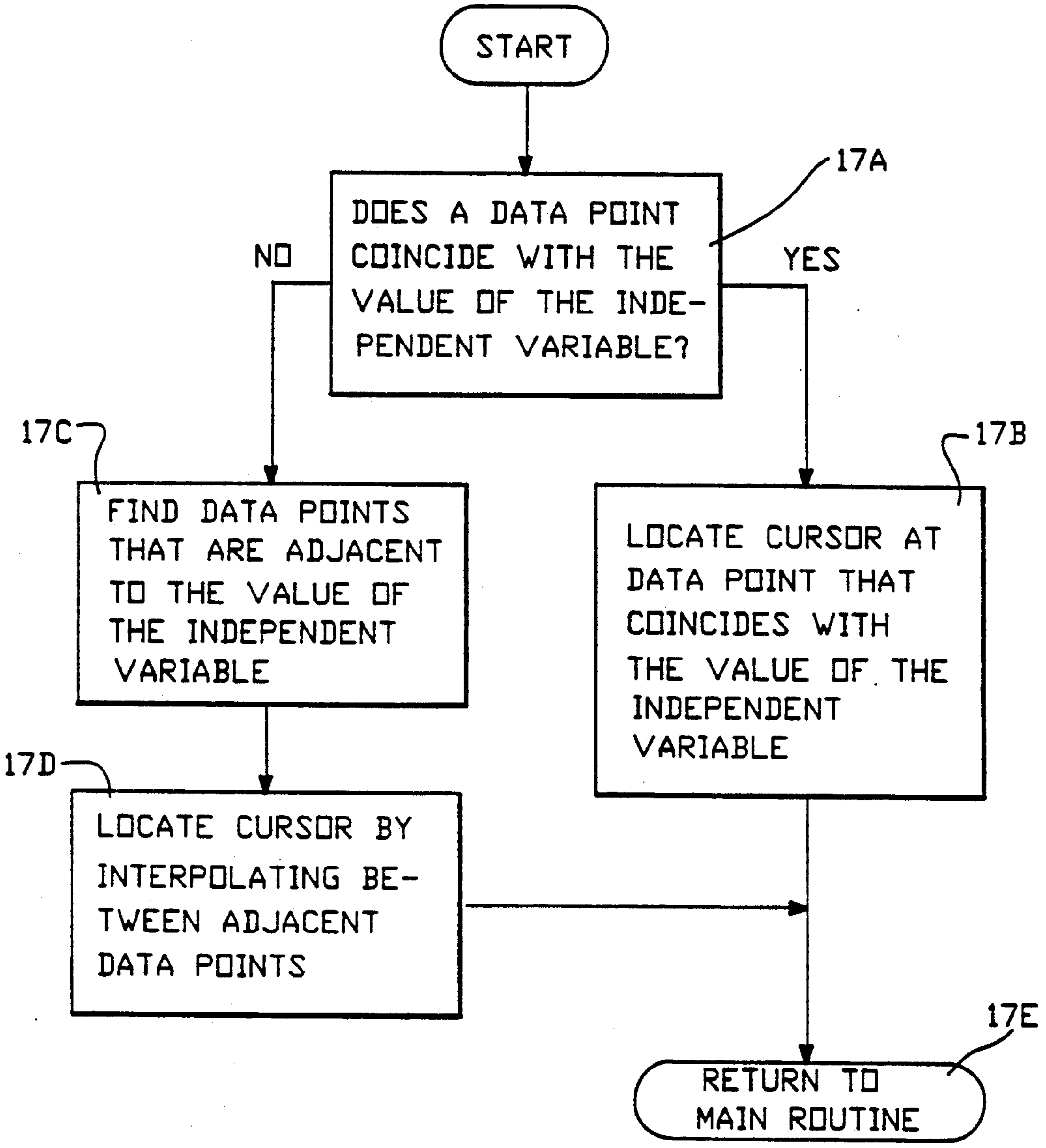
FIGS. 6, 7 and 8 are block diagrams illustrating in more detail some of the logical operations indicated in FIG. 5 for bivariate graphs, univariate graphs and numerical tables, respectively.

FIG. 6 illustrates in more detail the logical operations performed in the step 17 in FIG. 5: "Update Bivariate Plot Cursors." In step 17A, the system has been interrogated (step 15) as to whether one or more bivariate plots are in use and has answered "yes." The system is then asked whether a data point on the bivariate graph coincides with the present value $v_3'$ of the independent variable $v_3$. If the answer is "yes," the system proceeds to step 17B and locates the cursor on the graph at a data point that coincides with the present value of $v_3$. When this step is completed, step 17E then returns control to the main routine, which is the right-most sequence of operations in FIG. 5.

If the answer in step 17A is "no," the system carries out step 17C: find two adjacent data coordinate pairs $(v_1(v_{3,n}), v_2(v_{3,n}))$ and $(v_1(v_{3,n+1}), v_2(v_{3,n+1}))$ for which $v_{3,n}$ and $v_{3,n+l}$ are two consecutive, distinct values of $v_3$ in a monotonically increasing sequence $\{v_{3,m}\}_m$ of values for which $v_{3,n} < v_3' < v_{3,n+1}$ ($v_{3,n}$ and ($v_{3,n+1}$ are data points "adjacent to the value $v_3'$"). The system then carries out step 17D: use linear, quadratic or other interpolation to determine the interpolated values $v_1(v_3')$ and $v_2(v_3')$ of an interpolated coordinate pair $(v_1(v_3'), v_2(v_3'))$ and display the cursor at the position of this interpolated coordinate pair on the screen. After completion of step 17D, step 17E returns control to the main routine.

The step sequence 17A, 17B, 17E or 17A, 17C, 17D, 17E is repeated for each bivariate graph that is in use.

Figure 7:
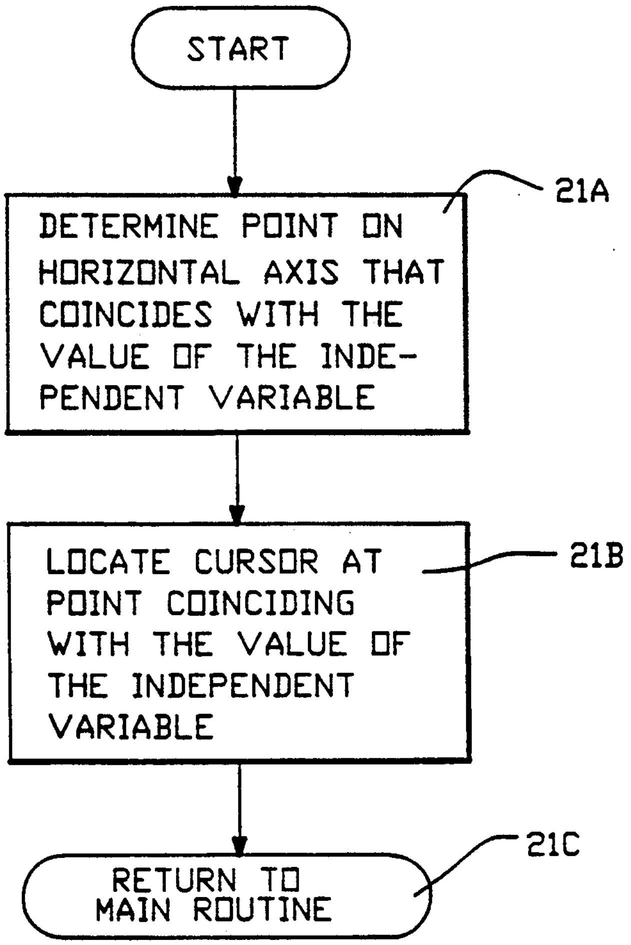

FIG. 7 illustrates in more detail the logic operations performed in the step 21 in FIG. 5: "Update Univariate Plot Cursors." For each univariate graph the independent variable $v_3$ is measured along a horizontal axis of the graph and a dependent variable, for example $v_1$, is measured along a vertical axis of the graph. For a given permitted value $v_3'$ of the variable $v_3$, the point on the horizontal axis of the graph that corresponds to that value is located in step 21A. In step 21B, the cursor is positioned at the point on the horizontal axis corresponding to the value $v_3 = v_3'$. In step 17C, control is returned to the main routine.

The step sequence 21A, 21B, 21C is repeated for each univariate graph that is in use.

Figure 8:
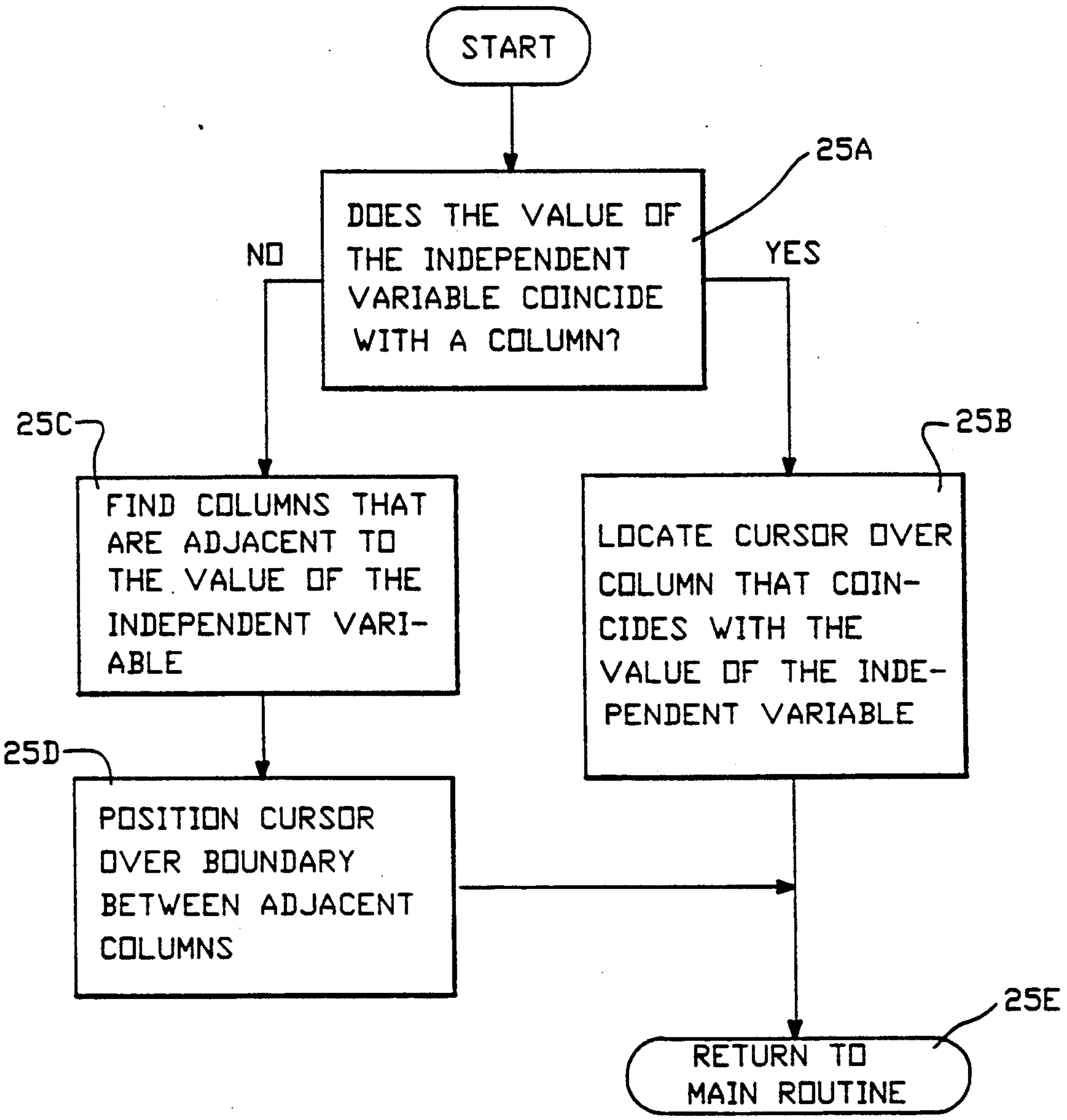

Details of the logical operations performed in step 25 ("Update Cursor in Tables") of FIG. 5 are shown in FIG. 8. The system has already determined that one or more table plots are in use. In step 25A of FIG. 8, the system inquires whether the present chosen value $v_3'$ of the independent variable $v_3$ coincides with a value of $v_3$ displayed in the table (a "column value" of $v_3$). If the answer is "yes," the cursor is positioned over the column that coincides with that column value in step 25B; and control is returned to the main routine in step 25E.

If the present chosen value $v_3'$ does not coincide with column value of $v_3$, step 25C is implemented and two adjacent column values $v_{3,n}$ and $v_{3,n+1}$ in the table are identified for which $v_3'$ satisfies $v_{3,n} < v_3' < v_{3,n+l}$. In step 25D the cursor in the numerical table is positioned at a boundary between the two columns corresponding to column values $v_3 = v_{3,n}$ and $v_3 = v_{3,n+1}$. In step 25E, control is returned to the main routine.

The step sequence 25A, 25B, 25E or 25A, 25C, 25D, 25E is repeated for each numerical table that is in use.

We claim:

1. A method for graphically displaying at least a first and a second independent physical relationship characterized by a common parameter, wherein the common parameter is defined at N values, the method comprising the steps of:

superimposing a two-dimensional Cartesian coordinate system on a graphical display, wherein a first axis corresponds to the first relationship and a second axis corresponds to the second relationship;

evaluating the first and second relationships at each of the N common parameter values, wherein corresponding evaluations form a location coordinate at each of the common parameter values and the N location coordinates form a set of display points;

labelling each display point on the display monitor, wherein the common parameter value is indicated for each display point and the first and second independent physical relationships are characterized by the set of display points; and positioning a first cursor on the display monitor at a selected common parameter value.

2. The method as recited in claim 1, further comprising the step of displaying the common parameter values in increasing order in entries of a table, wherein each entry contains one of the common parameter values and the corresponding location coordinate.

3. The method as recited in claim 2, further comprising the step of highlighting the entry containing the selected common parameter value.

4. The method as recited in claim 2, further comprising the steps of:

displaying the common parameter values in increasing order in entries of a table, wherein each entry contains one of the common parameter values and the corresponding location coordinate; and positioning a second cursor on the display monitor at the entry containing a selected common parameter value.

5. The method as recited in claim 4, further comprising the steps of:

moving the second cursor from the selected entry to a new entry;

interpolating intermediate positions between the selected location coordinate and the new location coordinate; and moving the first cursor from the selected location coordinate to the new location coordinate through the intermediate positions.

6. The method as recited in claim 5, wherein the step of interpolating comprises linear interpolation between the selected location coordinate and the new location coordinate.

7. The method as recited in claim 5, wherein the step of interpolating comprises quadratic interpolation between the selected location coordinate and the new location coordinate.

8. A method for displaying at least a first and a second independent physical relationship characterized by a common parameter on a display monitor, wherein the common parameter has N defined values, the method comprising the steps of:

superimposing at least two two-dimensional Cartesian coordinate systems on the display monitor such that a first system corresponds to the first relationship and a second system corresponds to the second relationship, wherein the first axis of each system corresponds to the common parameter and a second axis of each system corresponds to the respective relationship;

evaluating the first and second physical relationships at each of the common parameter values, wherein a first set of parameter display points is comprised of the corresponding first parameter evaluations and a second set of parameter display points is comprised of the corresponding second parameter evaluations;

displaying the first and second sets of parameter display points, wherein the sets are distinguishable from one another;

labelling each display point on the display monitor, wherein the labelling of the display points indicates the corresponding parameter value, the first and second independent physical relationships are characterized by the first and second sets of display points;

positioning a first cursor on the first system, wherein one of the display points corresponds to a selected parameter value; and positioning a second cursor on the second system at the selected parameter value.

9. The method as recited in claim 8, further comprising the step of displaying the common parameter values in increasing order in entries of a table, wherein each entry contains one of the common parameter values and the corresponding first and second relationship evaluations.

10. The method as recited in claim 9, further comprising the step of highlighting the entry containing the selected common parameter value.

11. The method as recited in claim 10, further comprising the step of positioning an entry cursor on the display monitor at the entry containing the selected common parameter value.

12. The method as recited in claim 11, further comprising the steps of:

interpolating first and second intermediate positions between the selected common parameter value and a new common parameter value for the first and second relationships; and moving the first cursor from the selected common parameter value to the new common parameter value through the first intermediate positions; and moving the second cursor from the selected common parameter value to the new common parameter value through the second intermediate positions.

13. The method as recited in claim 12, wherein the step of interpolating comprises linear interpolation between the selected common parameter value and the new parameter value.

14. The method as recited in claim 12, wherein the step of interpolating comprises quadratic interpolation between the selected common parameter value and the new parameter value.

* * * * *

UNITED STATES PATENT AND TRADEMARK OFFICE

CERTIFICATE OF CORRECTION

PATENT NO. : 5,307,455

DATED : 26 April 1994

INVENTOR(S) : Michael C. Higgins and James M. Lindauer

It is certified that error appears in the above-indentified patent and that said Letters Patent is hereby corrected as shown below:

Column 1, line 7, "ana" should read -- and --;

Column 3, line 58, "$v_2$curve" should read -- $v_2$ curve--;

Column 7, line 58, "$v_{3,n+1}$" should read -- $v_{3,\,n+1}$ --

Column 7, line 61, "$v_3'''$" should read -- $v_3''$ --;

Column 7, line 64, "$v_1(v_3')$ and $v_2(v_3')$" should read -- $\hat{v}_1(v_3')$ and $\hat{v}_2(v_3')$ --;

Column 7, line 65, "$(v_1(v_3')), v_2(v_3'))$" should read -- $(\hat{v}_1(v_3'), \hat{v}_2(v_3'))$ --.

Signed and Sealed this

Twentieth Day of September, 1994

Attest:

BRUCE LEHMAN

*Attesting Officer*

*Commissioner of Patents and Trademarks*